United States Patent [19]

Horwitz et al.

[11] 4,162,231

[45] Jul. 24, 1979

[54] METHOD FOR RECOVERING PALLADIUM AND TECHNETIUM VALUES FROM NUCLEAR FUEL REPROCESSING WASTE SOLUTIONS

[75] Inventors: E. Philip Horwitz, Elmhurst; Walter H. Delphin, Woodridge, both of Ill.

[73] Assignee: The United States of America as represented by the United States Department of Energy, Washington, D.C.

[21] Appl. No.: 865,347

[22] Filed: Dec. 28, 1977

[51] Int. Cl.$^2$ ............................ G21F 9/04; G21F 9/06
[52] U.S. Cl. ................................ 252/301.1 W; 423/2; 423/22
[58] Field of Search .................. 252/301.1 W; 423/2, 423/22, 9

[56] References Cited

U.S. PATENT DOCUMENTS

| 3,294,494 | 12/1966 | Moore | 423/9 |
| 3,437,431 | 4/1969 | Platz et al. | 423/22 |

OTHER PUBLICATIONS

Vaughen, V. C. A., et al., Chem. Abstracts, 59(1963) #9541f.
Shanker, R. et al., Chem. Abstracts, 85(Dec. 27, 1976) #195870u.
Colvin, C. A., Chem. Abstracts, 72(1970), #95839d.
Koch, G., Chem. Abstracts, 64(1966), #1573e.
Moore, F. L., *Anal. Chem.*, 38(3), 1966, pp. 510-512.

*Primary Examiner*—Benjamin R. Padgett
*Assistant Examiner*—Deborah L. Kyle
*Attorney, Agent, or Firm*—Dean E. Carlson; Frank H. Jackson; James W. Weinberger

[57] ABSTRACT

A method for recovering palladium and technetium values from nuclear fuel reprocessing waste solutions containing these and other values by contacting the waste solution with an extractant of tricaprylmethylammonium nitrate in an inert hydrocarbon diluent which extracts the palladium and technetium values from the waste solution. The palladium and technetium values are recovered from the extractant and from any other coextracted values with a strong nitric acid strip solution.

3 Claims, No Drawings

METHOD FOR RECOVERING PALLADIUM AND TECHNETIUM VALUES FROM NUCLEAR FUEL REPROCESSING WASTE SOLUTIONS

CONTRACTUAL ORIGIN OF THE INVENTION

The invention described herein was made in the course of, or under, a contract with the UNITED STATES DEPARTMENT OF ENEREGY.

BACKGROUND OF THE INVENTION

This invention relates to a method for the separation and recovery of palladium and technetium from aqueous solutions. More specifically, this invention relates to a method for the separation and recovery of fission produced palladium and technetium from aqueous acid nuclear fuel reprocessing waste solutions.

Fission products which result from the irradiation of nuclear reactor fuels are generally considered as harmful radioactive waste which require storage in an insoluble form for centuries. Most of these waste contain metals such as palladium which, when considered in the context of an ever increasing demand for the metal and its finite and diminishing reserves, become potential resources.

The use of a platinum metals based catalyst system by United States car manufacturers has resulted in an increased demand for metals of this type. Although present systems for air pollution control are platinum based, the next generation of pollution control systems is presently scheduled to include palladium metal. Palladium has found general use as an electrical contact metal and as a catalyst for various chemical manufacture and purification processes.

Technetium is nonexistent in nature and may have properties of value which warrant its recovery. Furthermore, recovery of technetium from the waste would eliminate one more radioactive component for which long-term storage must be provided. Furthermore, since it has been found that technetium has a tendency to migrate in soil, should it be leached from the stored radioactive solid wastes, it is preferred that it be separated from the other radioactive wastes and handled separately in order to prevent this from occurring.

Technetium is present in fission product wastes as $^{99}$Tc. Palladium is present as stable isotopes containing about 15 atom percent $^{107}$Pd of long half-life but low energy ($\sim$0.04 Mev). This low-energy radiation together with the biological inertness of palladium suggest this material can be utilized in many applications without regard to the presence of $^{107}$Pd, such as a catalyst.

While several processes have been developed for the recovery of palladium and technetium values, none of them have been completely satisfactory, in that the character of the feed solution must be changed greatly, the selective halogenation of certain elements is required, or large quantities of radioactive wastes are generated, which must ultimately be disposed of in some manner.

SUMMARY OF THE INVENTION

We have developed a process for the recovery of palladium and technetium values from nuclear fuel reprocessing waste solutions which eliminates many of the before enumerated problems. By the method of our invention, the aqueous acidic waste solution containing palladium, technetium and other values is contacted with an extractant of tricaprylmethylammonium nitrate (TCMA.NO$_3$) in an inert organic diluent whereby the palladium and technetium values are selectively extracted from the feed solution, and contacting the extractant containing these values with a nitric acid solution whereby the palladium and technetium values are selectively stripped from the loaded extractant into the nitric acid solution, thereby recovering the palladium and technetium values. The extractant may be scrubbed with a 1 M formic acid solution containing about 0.1 M nitric acid to remove any coextracted values before being recycled.

It is therefore one object of the invention to provide a method for recovering palladium and technetium from an aqueous acidic solution.

It is the other object of the invention to provide a method for recovering palladium and technetium values from aqueous acidic nuclear fuel reprocessing waste solutions containing these and actinide, rare earth and fission product values.

DESCRIPTION OF THE PREFERRED EMBODIMENT

These and other objects of the invention for recovering palladium and technetium values from an aqueous nitric acid nuclear fuel reprocessing waste solution containing these and actinide, rare earth and fission product values may be met by adjusting the concentration of the nitric acid in the waste solution to about 2.4 M to form a feed solution, contacting the feed solution with an organic extractant of about 0.1 M tricaprylammonium nitrate in a water-immiscible inert aliphatic or aromatic hydrocarbon diluent whereby the palladium and technetium values are selectively taken up by the extractant, and contacting the extractant containing the values with an aqueous strip solution about 8 M in nitric acid whereby the palladium and technetium values are stripped from the extractant.

The feed solution may be any aqueous nitric acid solution containing these and any other values. The nitric acid concentration may vary from 0.5 to 3.0 M, preferably 2.0 to 2.5 M and most preferably 2.4 M, thus, a solution with a nitric acid concentration outside of these ranges will require adjustment. The process of the invention was developed specifically for the recovery of palladium and technetium values from aqueous nitric acid fuel reprocessing waste solutions resulting from the Purex Process. These solutions are commercially referred to as the HAW and the EEW waste and vary slightly in nitric acid and actinide concentrations. Both solutions typically contain about 0.24 gms palladium and 0.14 gms technetium per liter in addition to quantities of actinides, rare earths and fission products. Alternatively, the feed may be a nitric acid waste solution from which the actinide and other values have already been partitioned or removed.

The extractant may range from about 0.05 to 0.5 M, preferably about 0.1 M, in tricaprylmethylammonium nitrate (TCA.NO$_3$). The diluent may be any inert, water-immiscible aromatic or aliphatic hydrocarbon such as diethylbenzene (DEB), diisopropylbenzene, xylene, dodecane or kerosene or a chlorinated carbon such as carbon tetrachloride, or a hydrogen bonding diluent such as a water-immiscible carboxylic acid. Although the extractant is quite specific for palladium and technetium values under the prescribed conditions, some neptunium and plutonium values which may be present in the feed and which are in the +4 valence state will be coextracted. Thus about 5% of the neptunium values and 90% of the plutonium values present in the feed solution will be coextracted with the palladium and technetium values. The palladium and technetium values are then separated from the coextracted actinide values during the stripping step. Any actinide or other values remaining in the extractant after stripping has removed the palladium and technetium values may be scrubbed by contact with an aqueous solution of 1.0 M formic acid containing 0.1 M nitric acid before being recycled.

Contact of the loaded extractant with an aqueous scrub containing 1.0 to 0.1 M nitric acid, preferably 0.44 M, may be necessary to remove any fission products such as zirconium and niobium which may become entrapped in the extractant.

The aqueous strip solution may vary from about 4 to 15 M, preferably about 8 M, in nitric acid in order to selectively strip the palladium and technetium values from the loaded extractant and away from any plutonium and neptunium values which may have been coextracted and which will remain in the extractant.

The palladium and technetium values may be recovered from the nitric acid strip solution and separated from each other by any method known to those skilled in the art. For example, the strip solution containing the palladium and technetium values may be evaporated to recover the nitric acid. The residue may then be dissolved in $H_2SO_4$ and treated with a reducing agent to reduce the palladium to the metal which is then filtered to recover the palladium metal while the remaining solution is heated to volatilize the technetium which is recovered for further processing or disposal.

The extraction temperature is not critical and may be carried out over a range of from about 25° to 75° C. with 50° C. generally preferred for the stripping step due to the decrease in the distribution ratio at the higher temperature. The extractant-feed contact temperature of 25° C. is slightly preferred over higher temperatures in order to improve distribution ratios. In general contact times are not critical, although 30 seconds was found satisfactory to ensure phase mixing. The actual extraction operation can be carried out in batch or continuous operation, using, for example, simple mixer-settlers, direct or countercurrent flow, centrifugal contactors, liquid-liquid extraction in a chromatographic column or using other similar conventional type equipment known to those skilled in the art. Phase ratios can be varied depending upon engineering considerations and economic factors.

The $TCA.NO_3$ extractant is capable of recovering about 98% of the palladium and greater than 99.9% of the technetium present in the feed solution using four extraction and two scrub stages along with about 5% of the neptunium and 90% of the plutonium when present in the +4 valence state. Stripping with four stages recovered about 96% of the palladium and greater than 99.9% of the technetium, giving an overall palladium recovery from the feed solution of about 94%.

The following examples are given to illustrate the process of the invention and are not to be taken as limiting the scope of the invention which is defined in the appended claims.

EXAMPLE I

A synthetic waste solution was prepared by mixing nitric acid solutions of salts of nonradioactive isotopes of fission products and rare earths. The quantities of fission product elements used were for liquid light-water reactor fuel irradiated to 33,000 Mwd/metric ton of heavy metal. The products from 1 metric ton of the fuel are assumed to be present in 5600 liters of a 2.9 M $HNO_3$ (HAW waste stream) or 5900 liters of a 2.4 M $HNO_3$ (EEW waste stream from from exhaustive tributyl phosphate extraction of the HAW waste stream). Separate portions of the synthetic waste were spiked with palladium and technetium for testing.

A countercurrent extraction process was set up using 0.1 M TCMA $NO_3$ in DEB, synthetic EEW waste solution which was 2.4 M in nitric acid and a scrub of 0.44 M $HNO_3$. The temperature was 25° C. The phase ratio of feed:organic scrub was 1.0:1.43:0.43. After four extraction and two scrub stages the extractant contained 98.0% of the palladium and 99.9% of the technetium present in the feed.

EXAMPLE II

The extractant from Example I containing the palladium and technetium values was contacted with 8 M $HNO_3$ strip solution at 25° C. with an organic to aqueous phase ratio of 1:1. After four stages of contact, about 4.0% of the palladium remained in the extractant as did about 7% of the technetium. This gave an overall palladium recovery from the feed solution of about 94'.

As can be seen from the preceding discussion and examples, the method of the invention provides a simple and effective method for the recovery of palladium and technetium values from nuclear fuel reprocessing waste solutions. It has been calculated that, by using the method of the invention, about 1.2 kg of palladium could be recovered from the waste resulting from the reprocessing of 1 metric ton of liquid light-water reactor fuel irradiated to 33,000 Mwd.

The embodiments of the invention in which an exclusive property or privilege is claimed are defined as follows:

1. A method for recovering palladium and technetium values from a nitric acid nuclear fuel reprocessing waste solution containing these and actinide, rare earth and fission product values comprising:
    adjusting the nitric acid concentration of the solution to 0.5 to 3.0 M;
    contacting the solution with an extractant of 0.05 to 0.5 M tricaprylmethylammonium nitrate in an inert water-immiscible aromatic or aliphatic hydrocarbon diluent whereby the palladium and technetium values are selectively extracted from the solution; and
    contacting the extractant containing these values with an aqueous solution 4 to 8 M in nitric acid whereby the palladium and technetium values are selectively stripped from the extractant, thereby recovering the palladium and technetium values.

2. The method of claim 1 wherein the nitric acid concentration in the waste solution is adjusted to 2.0 to 2.5 M.

3. The method of claim 1 wherein the extractant is 0.1 M in tricaprylmethylammonium nitrate.

* * * * *